July 31, 1928.  1,678,682
J. W. SMITH
BRAKE MECHANISM
Filed Sept. 26, 1922   2 Sheets-Sheet 1
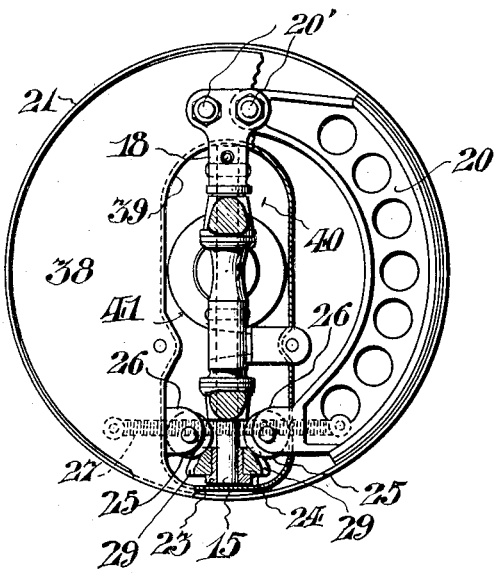
FIG. I.   FIG. II.
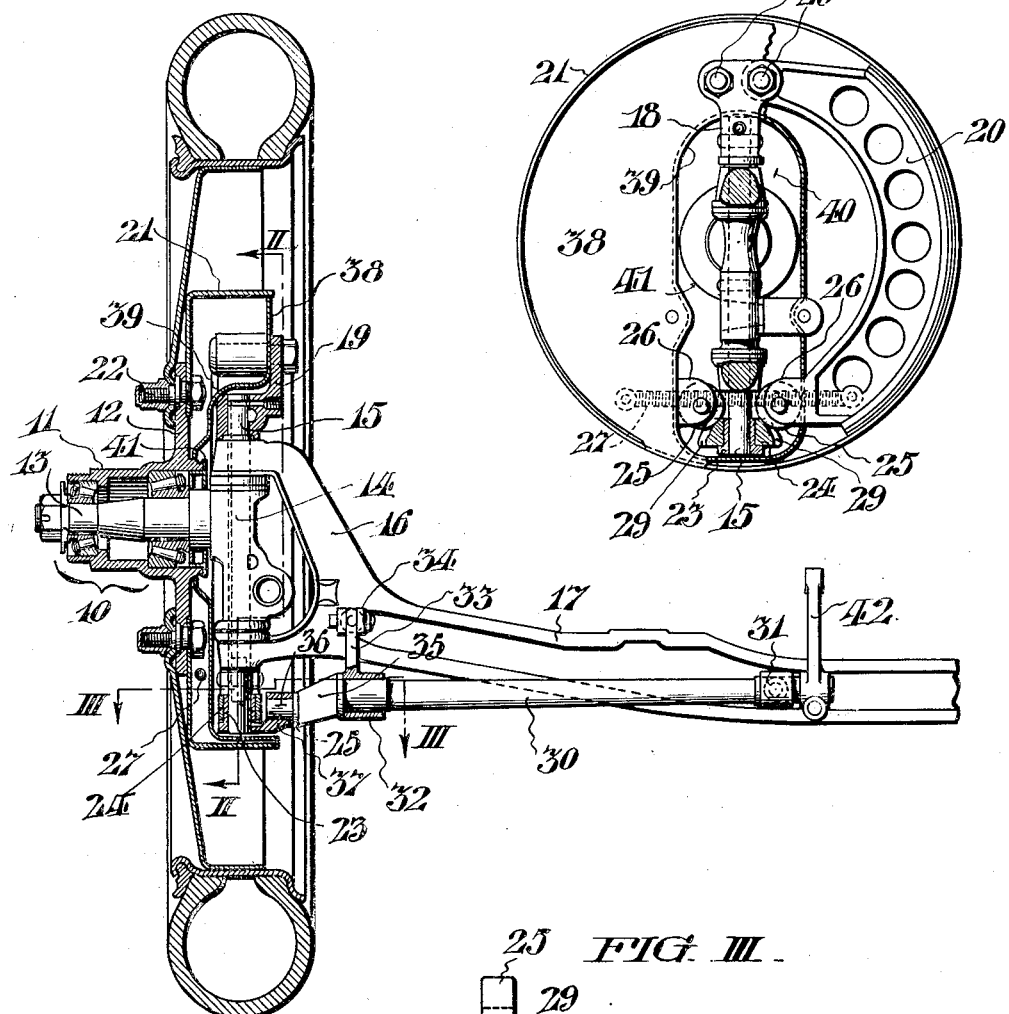
FIG. III.
FIG. VII.
WITNESSES:
John E. Bergner
Alfred E. Dichinger
INVENTOR:
John W. Smith,
BY Fraley Paul
ATTORNEYS.

July 31, 1928.　　　　　　　　　　　　　　　　1,678,682
J. W. SMITH
BRAKE MECHANISM
Filed Sept. 26, 1922　　　　2 Sheets-Sheet 2
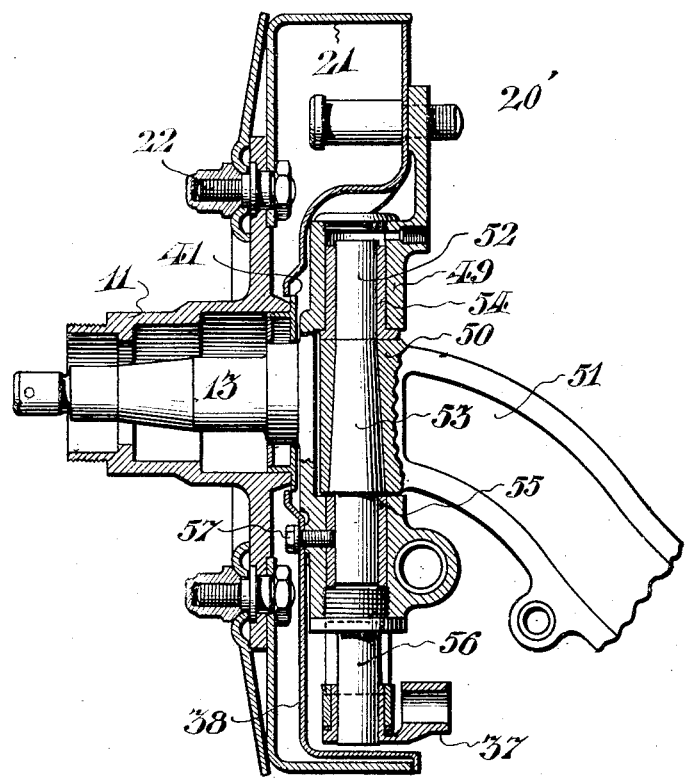
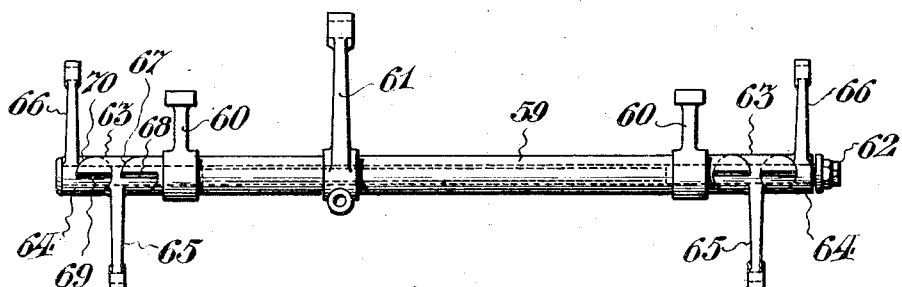
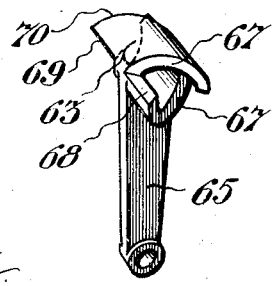
WITNESSES:　　　　　　　　　　　　　　　　INVENTOR:
John W. Smith,
BY
ATTORNEYS.

Patented July 31, 1928.

1,678,682

UNITED STATES PATENT OFFICE.

JOHN W. SMITH, OF PHILADELPHIA, PENNSYLVANIA, ASSIGNOR TO BUDD WHEEL COMPANY, OF PHILADELPHIA, PENNSYLVANIA, A CORPORATION OF PENNSYLVANIA.

BRAKE MECHANISM.

Application filed September 26, 1922. Serial No. 590,565.

This invention relates to automotive vehicles and more particularly to the type embodying braking mechanisms for the front or steering wheels in addition to the usual braking mechanism associated with the rear or traction wheels.

An object of the invention is to provide improvements in braking mechanisms for front wheels with a view to generally improving the mounting of such wheels whereby their efficiency of operation and durability is enhanced, and to secure other advantages which will become apparent as the nature of the invention is more clearly understood.

Another object of the invention is to provide improvements in braking mechanisms for front wheels consisting of a novel means for applying or transmitting motion to the braking mechanism in any adjusted position of the wheel effected in the course of steering the vehicle; to eliminate lost motion between the parts, to insure simplicity of operation and structure and to generally improve the operation of this portion of the mechanism.

Another object of the invention is to provide means for simultaneously applying power to the braking mechanisms at the front and rear ends of the vehicle and to equalize the power so distributed whereby each braking mechanism may be actuated to the same degree with respect to the other braking mechanisms.

A still further object of the invention is to provide means in a braking mechanism of the character stated for preventing the entrance of lubricant between the brake drum and brake shoes and to enclose the friction elements against the entrance of dust and moisture.

These and other objects are accomplished by what I now regard as the preferred form of my invention from among other possible arrangements embraced within the spirit of the invention and the scope of the appended claims.

In the accompanying drawings Figure I is a view in vertical section of a steering wheel for automotive vehicles, constructed in accordance with my invention.

Figure II is a view in vertical section taken on the line II—II of the preceding figure.

Figure III is a detail view in horizontal section taken on the line III—III of Figure I.

Figure IV is a view in section of a wheel hub showing a slightly modified form of mounting.

Figure V is a view in elevation of an equalizing device for dividing the braking effort among the several braking devices.

Figure VI is a view in perspective of one of the arms forming part of the equalizing device and illustrating the equalizing clutch members; and Figure VII is a detail view, partly in section showing a toggle as an alternative means to operate the brake shoes.

I have illustrated the present invention as embodied in a conventional form of vehicle wheel which is mounted for steering movement through the medium of a steering knuckle, with such alterations as may be required to incorporate my invention therein. With reference to Figures I and II of the drawings 10 indicates the hub portion of a vehicle wheel including the hub 11 and a radial annular hub flange 12. The spindle, indicated at 13, is of the usual type and is supported within the hub through the medium of anti-friction bearings. Formed upon the spindle 13 is the knuckle 14 drilled to receive the knuckle pin 15 which is supported for rotation within the appropriately formed terminals of a yoke 16 constituting part of the axle 17. The knuckle pin 15 extends upwardly beyond the yoke 16 to receive in fixed engagement a sleeve 18 having a support 19 formed therewith for the purpose of pivotally supporting a pair of depending segmental braking members or shoes 20 through the medium of bolts 20' which pass through the support 19 and the apertured upper terminals of said brake shoes.

A brake drum 21 is supported upon the hub flange 12 by means of bolts 22, said brake drum enclosing the brake shoes 20 whereby the latter may be urged in engagement with the brake drum 21 in arresting motion of the vehicle.

The knuckle pin 15 is fixed in the knuckle 14 and extends downwardly beyond the lower end of the yoke 16 for the purpose of affording a guide for a wedging arrangement, comprising a bushing 23 having a sliding and rotating fit upon the knuckle pin 15 and a cone shaped wedge member 24 which is received between a pair of rollers 25, each of the latter being journalled between spaced ears 26 formed upon the lower ends of the brake shoes 20. The latter are normally urged toward each other and consequently to inoperative position through the medium of a spring 27 having its terminals fixed in any suitable manner to the lower ends of the brake shoes 20. In order to assure vertical rectilinear movement of the wedge member 24 without displacement from its operative relation to other parts said wedge member is formed with opposed flanges 28, which upon engagement with adjacent parts serve to guide the wedge 24 in a manner which will become apparent upon examination of Figure III. Opposed faces of the wedge member 24 are preferably grooved as at 29 for the reception of the rollers 25.

The operating mechanism includes a shaft 30 mounted in contiguous relation to the axle 17 and supported at one end through the medium of a bearing 31 extending from said axle, said bearing 31 having a ball-and-socket connection to afford universal motion, while the opposite end of the shaft or that end adjacent the wheel is supported in a bearing sleeve 32 at the lower end of an arm 33 which in turn is hingedly supported between ears 34 extending from the axle 17 so as to afford lateral motion of the shaft 30 in a plane substantially parallel to the longitudinal axis of the vehicle.

The end of the shaft 30 supported in this manner may be termed the floating end and the specific mounting described is provided for the purpose of permitting transmission of power to the brake shoes 20 in any position of the wheel. The shaft 30 is thus afforded lateral motion as well as rotative motion relative to the axle 17. Power is applied through the medium of a crank arm 35 which is formed integral with the shaft 30, the terminal of said arm being reduced to form a pin 36 which is received within a socket member 37 constituting part of the bushing 23.

I further provide a diaphragm or cover indicated at 38 for the purpose of excluding dust and moisture from the interior of the brake drum 21, consisting of a plate, the outer periphery of which follows closely the contour of said brake drum but the center portion of which is expanded inwardly as at 39, forming a recess 40 in which the steering knuckle 14 and supported parts are received.

The expanded portion 39 is apertured centrally to receive the protruding end of the hub 11 which for the purpose of this invention is extended inwardly as shown and in close relation to prevent the passage of oil from the hub bearing into the space within the brake drum or between the brake drum 21 and the brake shoes 20. If desired an annular fin 41 may be provided upon the inner end of the hub 11 to throw waste lubricant by centrifugal force into the cavity 40 and thereby prevent the passage of such waste lubricant into the brake drum 21.

The power is supplied from the foot pedal or other actuating element to the shaft 30 by means of an arm 42 extending from the inner end of said shaft, so as to rotate the latter through a partial revolution, the effect of which, when applying the brakes, is to elevate the terminal 36 of the crank arm 35 thereby forcing the wedge 24 between the rollers 25, causing the brake shoes 20 to be separated and applied to the inner sides of the brake drum 21. It will be apparent that this function will take place in any position of the wheel relative to the axle 17 since the wedge member 24 is located on a line coinciding with the center of movement of the steering knuckle 14 or in alignment with the knuckle pin 15. Thus, the wedge member 24 need not necessarily be carried by the knuckle pin 15 but upon any convenient support, provided the relation of the parts above mentioned is retained. During steering movement of the wheel the knuckle pin 15 is free to rotate within the wedge bushing 23 while the wedge member 24 is free to rotate upon said bushing and to swing around with the wheel, the wedge member 24 being carried at the same time up and down by the bushing 23 and the latter being in turn shifted by rocking of the crank arm 35. It will be noted that the composite movement imparted to the shaft 30 resulting from the rectilinear guidance of the wedge 24 and rotative movement of the crank arm 35 is compensated for by the floating support provided by the hinged arm 33, and ball-and-socket connection of the bearing 31 on the axle 17.

I have illustrated in Figure IV my invention applied to a different type of knuckle in which the spindle 13 is provided with a yoke 49 adapted to receive the appropriately formed terminal 50 of the axle 51 therebetween. The knuckle pin 52 is formed with a central tapering portion 53 which is received within the axle terminal 50. The upper end of the knuckle pin 52 is fitted into a bushing 54 which is received within the upper terminal of the yoke 49 while the lower end of said knuckle pin is received within a bushing 55 held within the lower end of the yoke member 49, the latter being suitably channeled to receive said bushing and threaded internally for cooperation with the enlarged threaded portion of a cap fitted therein, said cap having a depending stud 56 located in alignment with the knuckle pin 52 and designed to support and guide the wedge member 24 or any suitable operating means for the brake shoes.

A set screw 57 is fitted in a lateral opening formed in the lower yoke terminal to retain the bushing 55 in place and incidentally to afford an auxiliary securing means for the cover plate 38. Otherwise the construction is substantially identical to that of the first described wheel mounting.

In the successful operation of four wheel brakes it is necessary to divide or equalize the braking effort between the four braking mechanisms. This has been heretofore accomplished by means of differentiating devices of a more or less complex and inefficient nature. I have devised an extremely simple and effective mechanism whereby this purpose may be accomplished and refer to Figures V and VI wherein 59 designates a tubular shaft adapted to be extended transversely of the vehicle, located preferably at a medial point and supported by means of brackets 60 for rotation. The tubular shaft 59 is rotated by means of an arm 61 affixed thereto and adapted for linkage connection to the brake pedal.

A rod 62 extends throughout the length of the tubular shaft 59 and beyond the ends supports a pair of sleeves 63 and a pair of sleeves 64, the former being interposed between the latter and the ends of said tubular shaft. The sleeves 63 are each provided with a radial arm 65 for linkage connection to one of the braking mechanisms of the front wheels, or to the arms 42 of the type illustrated in Figure I, while the sleeves 64 are each provided with an arm 66 adapted for linkage connection to the braking mechanism of the rear or traction wheels of the vehicles. The adjacent or contacting ends of the tubular shaft 59 and the sleeves 63 are formed with complementary spiral or equalizing clutch faces 67 and axial faces 68, the spiral faces 67 permitting limited movement between the said parts in one direction by gradually causing binding engagement therebetween so as to eventually completely limit such movement. In a similar manner the adjacent ends of the sleeves 63 and 64 are formed with axial faces 69 and spiral co-operating faces 70 arranged with respect to the spiral faces 67 so that binding action of the sleeves 64 will occur upon rotation thereof relative to the tubular shaft 59 in a direction opposite to that of the sleeve 63. One end of the rod 62 is headed and the other end threaded to receive a nut enabling the relative spacing of the sleeves 63, 64 and the amount of lost motion to be varied by adjusting said nut.

In the operation of this device it will be noted that when the brakes are applied, effecting rotation of the tubular shaft 59, during initial rotative movement of the latter the spiral faces 67 at the ends of the shaft 59 will be gradually tightened against the contacting spiral faces of the sleeves 63 until the latter are carried therewith, and upon motion of the sleeves 63 the sleeves 64 will likewise be successively tightened in the same manner and carried therewith so that a distribution of binding strains will take place between the spiral faces 67 and 70 at each end of the device and eventually the power transmitted to the braking devices to an equal and uniform degree.

In lieu of the wedge for separating the brake shoes 20 an alternative means may be provided in the form of a toggle as shown in Figure VII in which a sleeve 71 is fitted upon the bushing 23 and formed with opposed pairs of ears 72 between which links 73 are pivotally held. The opposite ends of the links are pivoted between the spaced ears 26 of the brake shoes 20 so that sliding motion of the sleeve 71 upon the knuckle pin 15 or other support will effect separation or retractive movement of said brake shoes, as the case may be.

Having thus described my invention, I claim:

1. In combination, a steering knuckle, axle and brake mechanism, a pair of relatively rotatable members movable in unison relative to the axis of oscillation of the steering knuckle, means operating upon one member to effect floating movement thereof, and means operable by the other member to apply the brake mechanism.

2. In combination, a steering knuckle, an axle and brake mechanism, a member movable along and rotatable about the axis of oscillation of the steering knuckle, a second member carried by the first member and rotatable relative thereto, and means having an operative connection with said second member to move it and the first member to actuate the brake mechanism.

3. In combination a steering knuckle, an axle and brake mechanism, a guide member located in the axis of oscillation of the steering knuckle, a radially movable element guided upon said guide member and rotatable relative thereto, an actuating member carried by said element and rotatable relative thereto, and means for operating the actuating member to apply the brake mechanism.

4. In combination, a steering knuckle, an axle and brake mechanism, a member movable along the axis of oscillation of the steering knuckle and having capacity for rotation, an operating device having movement relative to said axle to move said member in the manner stated, an actuating element carried by said member and rotatable relative thereto, and means operable by said actuating element to actuate the brake mechanism.

5. In a vehicle wheel, a steering knuckle for supporting the same including a knuckle pin, a brake drum, a braking element coacting with said drum, an actuating member for said braking element movable along the axis of oscillation of the knuckle pin, and a crank shaft for actuating said member floatably supported adjacent one end and universally supported adjacent its other end.

6. In a vehicle wheel, a brake drum, a pair of relatively movable brake shoes, a roller carried by each shoe, a cone-shaped actuating member having opposed grooves operating between the rollers for moving the shoes into operative engagement with the brake drum, and floating means for actuating said cone-shaped member.

7. The combination with a vehicle wheel mounted for steering movement and the axle thereof, of a braking mechanism carried by said wheel, a radially movable member for operating the braking mechanism, a shaft, means supporting the shaft upon the axle for rotative and swinging movement, and a crank connection between the shaft and radially movable member.

8. The combination with a vehicle wheel mounted for steering movement of a braking mechanism carried by said wheel, a radially movable member for actuating the braking mechanism, a shaft, a swivel means for supporting one end of the shaft upon the axle, means for supporting the other end of the shaft for swinging movement, and a crank connection between the shaft and the radially movable member.

9. The combination with a vehicle wheel mounted for steering movement and the axle thereof, of a braking mechanism, a wedge member movable radially to actuate the braking mechanism, means carried by said axle for rotation and having operative connection with the wedge member, and means mounting said first named means for universal movement relative to the axle.

10. In combination, a steering knuckle, an axle and brake mechanism, a guide pin forming part of the knuckle and constituting a contructive prolongation of the knuckle pin, a bushing slidably and rotatively mounted on said pin, a floating shaft mounted on the axle and having a crank portion operatively connected to the bushing to shift the same, an actuating member carried upon and enclosing the bushing and rotatable relative thereto, and means operable by movement of the actuating member to operate the braking mechanism.

11. The combination of a vehicle wheel mounted for steering movement and a steering knuckle, a brake drum and braking mechanism mounted therein, a cover functioning to form a closure for the brake drum to prevent entrance of dust and having a dished portion excluding the steering knuckle from the brake drum to prevent the passage of oil into the brake drum, and associated means adapted to throw waste lubricant by centrifugal force into said dished portion.

12. The combination of a vehicle wheel mounted for steering movement, and a steering knuckle and hub having an inwardly protruding extension, a brake drum and braking mechanism mounted therein, a cover plate closing the side of the brake drum and having a central inwardly expanded portion surrounding the steering knuckle to exclude the same from the interior of the brake drum, a central opening in said expanded portion to receive the hub extension in close engagement thereby preventing the passage of lubricant to the interior of the brake drum, and an associated annular fin adapted to throw waste lubricant by centrifugal force into the expanded portion.

13. The combination of a vehicle wheel mounted for steering movement and a steering knuckle and hub, the latter having an inwardly directed extension, a brake drum and brake shoes, a cover plate closing the side of the drum and having a central inwardly expanded portion forming a cavity to receive the steering knuckle and exclude the same from the drum, and an annular fin carried by said extension to throw waste lubricant into said cavity and thereby prevent entrance of such lubricant into the drum.

14. In combination, a steering knuckle, an axle and brake mechanism, a member movable along and rotatable about the axis of oscillation of the steering knuckle, a second member positioned between said first member and said brake mechanism, and means having an operative connection with said second member to move it, and the first member to actuate the brake mechanism.

15. The combination of a vehicle wheel, a steering knuckle, a brake drum and braking mechanism mounted therein, a cover adapted to form a closure for the drum and to prevent the passage of lubricant from the steering knuckle into the drum.

16. The combination of a vehicle wheel, a hub, a steering knuckle, a brake drum and braking mechanism mounted therein, a cover adapted to form a closure for the drum and having a portion excluding the steering knuckle and the inner end of the hub from the drum to prevent the passage of lubricant into the drum.

In testimony whereof, I have hereunto signed my name at Philadelphia, Pennsylvania, this 18th day of September, 1922.

JOHN W. SMITH.